(12) United States Patent
Wanner et al.

(10) Patent No.: US 9,139,436 B2
(45) Date of Patent: Sep. 22, 2015

(54) METHOD AND DEVICE FOR SEPARATING ARGON FROM A GAS MIXTURE

(75) Inventors: Michael Wanner, Mainaschaff (DE); Herbert Nickel, Langenselbold (DE)

(73) Assignee: ReiCat GmbH, Gelnhausen (DE)

( * ) Notice: Subject to any disclaimer, the term of this patent is extended or adjusted under 35 U.S.C. 154(b) by 971 days.

(21) Appl. No.: 13/144,330

(22) PCT Filed: Jan. 4, 2010

(86) PCT No.: PCT/EP2010/000003
§ 371 (c)(1),
(2), (4) Date: Dec. 12, 2011

(87) PCT Pub. No.: WO2010/081640
PCT Pub. Date: Jul. 22, 2010

(65) Prior Publication Data
US 2012/0085125 A1    Apr. 12, 2012

(30) Foreign Application Priority Data
Jan. 14, 2009  (DE) .......................... 10 2009 003 350

(51) Int. Cl.
*F25J 1/00* (2006.01)
*C01B 23/00* (2006.01)
(Continued)

(52) U.S. Cl.
CPC ........... *C01B 23/0094* (2013.01); *F25J 3/0285* (2013.01); *F25J 3/08* (2013.01); *C01B 2210/0006* (2013.01);
(Continued)

(58) Field of Classification Search
CPC . F25J 2205/82; F25J 2245/58; F25J 2200/02; F25J 2205/40; F25J 2205/60; F25J 3/08; F25J 3/0285; C01B 23/0094; C01B 2210/0006; C01B 2210/0014; C01B 2210/0034; C01B 2210/0045; C01B 2210/0062
USPC .......................................................... 62/600
See application file for complete search history.

(56) References Cited

U.S. PATENT DOCUMENTS 2,874,030 A   2/1959  Wolcott
3,181,306 A   5/1965  Geist et al.
(Continued)

FOREIGN PATENT DOCUMENTS

CA    577729      6/1959
CN    1143538 A   2/1997
(Continued)

OTHER PUBLICATIONS

International Search Report for International Application No. PCT/EP2010/000003 issued Aug. 23, 2010.
(Continued)

*Primary Examiner* — Ljiljana Ciric
(74) *Attorney, Agent, or Firm* — Maier & Maier, PLLC

(57) ABSTRACT

A method and a device for separating argon from a gas mixture. The method includes steps of collecting the gas mixture, separating the oxygen present in the gas mixture, drying the gas mixture, and cryogenically purifying the remaining gas mixture for separating the argon in liquid form. The device for performing the method includes a collector for the gas mixture, a component for catalytic and/or adsorptive separation of oxygen from the gas mixture, a component for drying the gas mixture, and a system for cryogenically purifying the gas mixture and separating the argon in liquid form.

7 Claims, 1 Drawing Sheet

(51) Int. Cl.
*F25J 3/02* (2006.01)
*F25J 3/08* (2006.01)

(52) U.S. Cl.
CPC ............ *C01B 2210/0014* (2013.01); *C01B 2210/0034* (2013.01); *C01B 2210/0045* (2013.01); *C01B 2210/0062* (2013.01); *F25J 2200/02* (2013.01); *F25J 2205/40* (2013.01); *F25J 2205/60* (2013.01); *F25J 2205/82* (2013.01); *F25J 2245/58* (2013.01); *F25J 2290/50* (2013.01)

(56) References Cited

U.S. PATENT DOCUMENTS

| | | | | |
|---|---|---|---|---|
| 4,338,108 | A | * | 7/1982 | Isalski et al. ............ 62/622 |
| 4,549,890 | A | * | 10/1985 | Bligh ........................ 62/622 |
| 4,762,542 | A | * | 8/1988 | Mishkovsky et al. ...... 62/630 |
| 4,935,044 | A | * | 6/1990 | Schoenpflug .............. 95/288 |
| 5,536,302 | A | | 7/1996 | Golden et al. |
| 5,607,572 | A | * | 3/1997 | Joshi ........................ 95/138 |
| 5,706,674 | A | * | 1/1998 | Hsiung et al. ............. 62/632 |
| 5,783,162 | A | | 7/1998 | Tomita et al. |
| 6,123,909 | A | * | 9/2000 | Yamamoto et al. ...... 423/210 |
| 6,523,356 | B2 | * | 2/2003 | Hasson et al. ............ 62/49.1 |
| 7,067,087 | B2 | * | 6/2006 | Jaynes ...................... 62/600 |
| 7,392,657 | B2 | * | 7/2008 | Giacobbe .................. 62/600 |
| 7,501,009 | B2 | * | 3/2009 | Graham et al. ............ 95/98 |
| 8,016,981 | B2 | * | 9/2011 | Savinov et al. ............ 62/617 |
| 8,377,401 | B2 | * | 2/2013 | Darde et al. ............... 62/617 |
| 8,713,964 | B2 | * | 5/2014 | Le Bihan et al. .......... 62/600 |
| 8,889,093 | B2 | * | 11/2014 | Malhotra et al. ......... 423/359 |

FOREIGN PATENT DOCUMENTS

DE  197 08 025 A1  9/1997
WO  2010/081640 A2  7/2010

OTHER PUBLICATIONS

J.V. O'Brien & R.V. Schurter, The Recovery and Recycling of High Purity Argon in the Semiconductor Industry, AICHE National Meeting, Mar. 6, 1988, pp. 1-19, XP002957420.

* cited by examiner

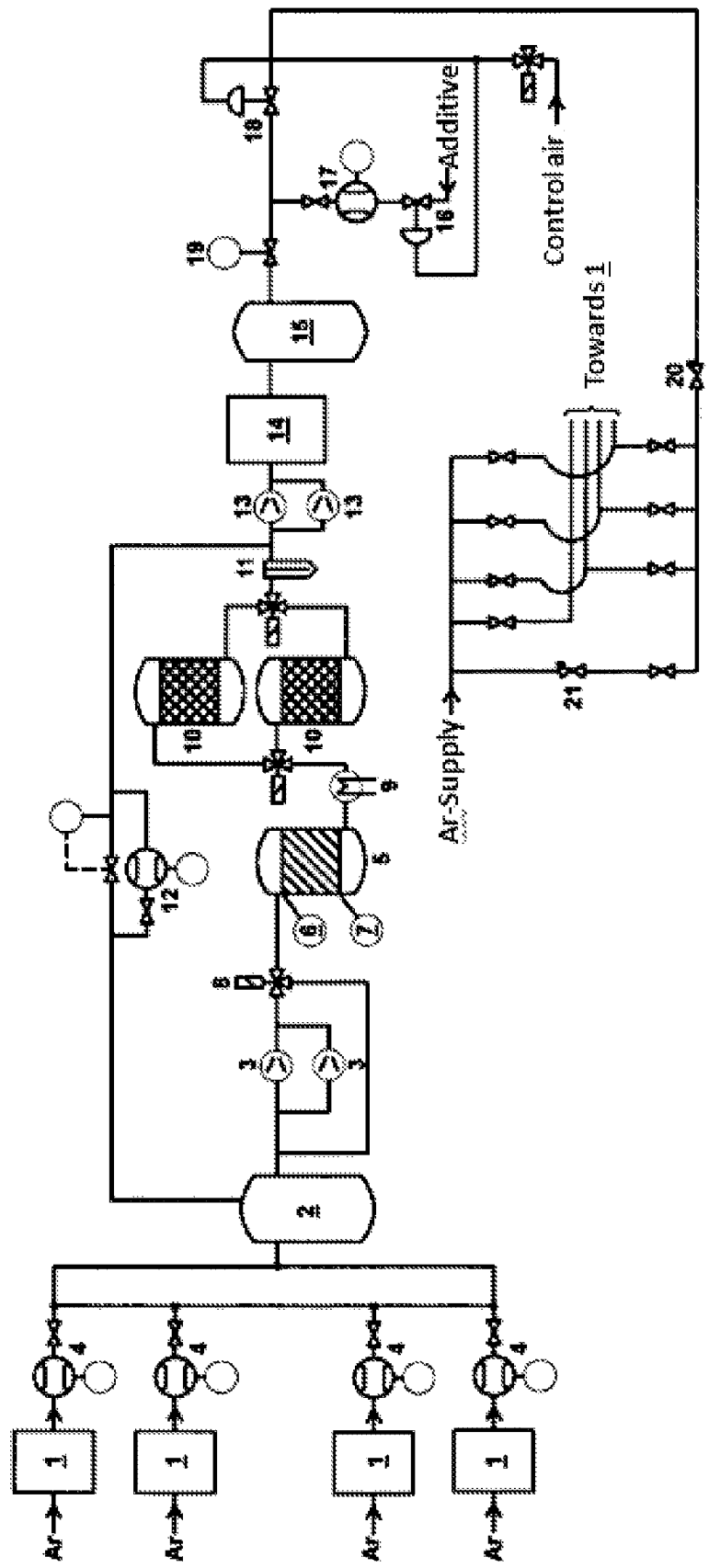

METHOD AND DEVICE FOR SEPARATING ARGON FROM A GAS MIXTURE

This application hereby claims the benefit of the commonly assigned International Patent Application No. PCT/EP2010/000003 (filed Jan. 4, 2010, in the European Patent Office), and the commonly assigned German Patent No. 10 2009 003 350.5 (filed Jan. 14, 2009, in the German Patent Office) both of which are hereby incorporated by reference in their entirety.

The present invention relates to a method and a device for separating argon from a gas mixture. In particular it relates to the use of the same for the recycling of argon from the shielding gas of melting plants for the pulling of silicon crystals.

The production of mono- and polycrystalline silicon crystals, for example for use is solar cells, is carried out by means of a crystal pulling process under a shielding gas atmosphere. The shielding gas prevents the contamination of the silicon and supports the targeted cooling of the pulled crystals. An established method for this is the so-called string ribbon method, whereby two parallel wires are pulled through a melt of silicon, and whereby a silicon film is formed between the same, which then crystallises and grows onto a core foil. The wires here serve the purpose of stabilising the edges of the growing silicon foil. A particularly stabile pulling process is realised in this way.

One example of the string ribbon method is found, amongst others, in U.S. Pat. No. 4,299,648 A, where a method and a device for drawing monocrystalline wafers characterised in that two elements positioned at a distance from each other are pulled from a melt is described, whereby a meniscus of the melt is built up between the two elements.

A further development of the method is described in WO 2006111668 A1. It consists of thin support strips positioned parallel in addition to the side delimiting pulling wires between the same being used for pulling out the wafer. This modified method is suitable for producing polycrystalline silicon wafers for the production of photovoltaic cells.

Argon with a high purity (99.9990%) is generally used as a shielding gas with this method for producing silicon wafers when melting the silicon granulate, whilst small quantities of additives can be admixed to the same. During the process the shielding gas is contaminated and is usually vented to atmosphere once it has flowed through the furnace. A large-scale production preparation has not taken place to date.

These methods, which are known in themselves, for producing the silicon foils differ mainly with regard to the pressure ratios in the melting furnace. The melting process takes place either in an open furnace under atmospheric conditions, whereby the argon exits from the furnace at a point where the finished product is also continuously pulled from the furnace, or the furnaces form an enclosed system that works under severely reduced pressures (a few millibar of absolute pressure). The furnaces previously loaded with shielding gas are then emptied by means of vacuum pumps and the argon will be found in the exhaust gas of the pumps in this case.

Due to the contaminations from the production process the gas mixture leaving the furnace and consisting mainly of argon cannot be returned directly to the furnace. In order to recycle the argon prior cleaning is necessary, e.g. the argon must be separated out of the gas mixture. This poses the particular problem of separating the argon from the other gas components with a very high selectivity in order to achieve the purity required for a shielding gas.

It is the purpose of the invention to provide a method and a device that will allow the separation of argon from a gas mixture on a large-scale production basis. A further aspect of the invention relates to the particular use of this device and the method for the recycling of argon from the exhaust air of crystal pulling furnaces for semi-conductor crystals, in particular silicon crystals, whereby the extraction of the gas mixture from the furnace is of particular importance here.

The task is solved in accordance with the invention by the method for recycling argon by separating and cleaning the argon from a gas mixture, comprising the method steps of collecting the gas mixture in a collecting container, the catalytic and/or absorptive separation of the oxygen contained in the gas mixture, drying of the remaining gas mixture, and the cryogenic purification of the remaining gas mixture in a rectification column, whereby the cleaned argon is extracted from the rectification column in a liquid form.

Methods for separating argon from a gas mixture, where the argon is however obtained in a gaseous form, have already been described in prior art (known for example from the documents DE 197 08 025 A1, US 2008/0312347 A1, U.S. Pat. No. 7,361,316 B2, U.S. Pat. No. 6,123,909 A, U.S. Pat. No. 5,783,162 A, U.S. Pat. No. 5,106,399 A and U.S. Pat. No. 4,477,265 A). Contrary to this the argon is extracted from the rectification column in a liquid form with the method of the invention.

Cryogenic purification is a known method for separating gas mixtures. However, the difference between the boiling points of argon and oxygen, which in particular interferes negatively with the crystal pulling process, is less than 3 K. Although it is quite possible to guarantee the necessary purity of the argon with only one cryogenic purification process the requirements on the selectivity of the column will in this case be too high to be economically viable. It is for this reason also that the argon has so far not been separated and cleaned, but is disposed of with the exhaust gas. With the upstream removal of oxygen according to the invention only those components need to be separated out whose boiling points differ by at least 10 K ($Ar/N_2$). The technical, and therefore the financial effort for the cryogenic purification is therefore substantially reduced. The column can be simpler and smaller on the one hand, which also saves space, whilst the operating cost of the plant is reduced on the other hand, as less liquid nitrogen is used for cooling. A further advantage that should not be underestimated is the increased susceptibility towards operating malfunctions where additional air (oxygen) enters the system.

These advantages more than compensate for the additional effort of pre-cleaning with subsequent drying. The advantages of the method grow with increasing concentration of the oxygen contamination.

The separation of oxygen is preferably realised by means of catalytic conversion with hydrogen into water. The gas mixture is, where necessary, admixed with enough hydrogen to ensure that the same is at a stoichiometric ratio to the oxygen present in the same. An excess of 0.1 vol. % hydrogen is particularly preferably dosed. In a further embodiment of the method the separation of oxygen is realised by means of adsorption.

Especially preferably the separation of oxygen is realised depending on the oxygen content of the gas mixture either by means of adsorption or though catalytic conversion with hydrogen into water. For an oxygen content of up to 0.01 vol. %, preferably up to 0.005 vol. %, adsorptive cleaning is carried out, with catalytic cleaning taking place at higher concentrations.

In a preferred embodiment of the method the separated liquid argon is used for pre-cooling the gas stream entering cryogenic purification and is then evaporated in an evaporation unit. In this way even more liquid nitrogen for the cryogenic purification process can be saved if the recycled argon is not to be stored in liquid form, or if a direct return without interim storage is envisaged.

According to the invention the oxygen content in the gas mixture is preferably determined by determining the temperature difference between inlet and outlet of the catalyst unit. This allows an exact determination of the oxygen content by means of the calculation of the reaction heat without using additional sensors.

If the method of the invention is used for the collection of the gas mixture from an atmospherically operating furnace for melting silicon then this is particularly preferably realised by means of an extraction system working with underpressure, located below the normal furnace outlet and extracting a part stream of the shielding gas. Although argon has a higher density than air, and will therefore settle from the top near the outlet of the of atmospherically operating plants to a great extent, a collection at this point is not sensible, as a mixing with ambient air could not be prevented. This would render the preparation a lot more complex. The extraction system therefore extracts the gas stream below the outlet opening, where a mixing with air will not yet take place. As a slight overpressure always exists inside the furnace and shielding gas must flow out of the outlet opening so that air cannot enter the furnace only a part stream can therefore be extracted here.

In a further preferred embodiment of the method the collection of the gas mixture from a furnace for melting silicon working under vacuum is realised by means of extracting the exhaust gas stream of the vacuum pumps, whilst deoiling of the gas stream takes place prior to introduction into the collecting container if the pumps are oil lubricated. If oil lubricated pumps are used for generating the vacuum then all oil residues must be completely removed prior to the actual recycling process to prevent damaging the catalyst. With so-called dry rotors no further measures will be required.

A further task of the invention is solved by a device for carrying out the method of the invention, the same comprising a collecting container for the gas mixture, an assembly for the catalytic and/or adsorptive separation of oxygen from the gas mixture, an assembly for drying the gas mixture and a system for the cryogenic purification of the gas mixture and the separation of liquid argon.

With a preferred embodiment of the device the separated liquid argon pre-cools the gas stream entering cryogenic purification by means of a heat exchanger and is subsequently evaporated in an evaporation unit.

The device is especially preferably equipped with a container for storing the cleaned liquid or gaseous argon, so that the plant can also work continuously and without losses when more argon is required than is available from the gas stream to be cleaned, or when less argon is introduced into the furnaces than is currently cleaned.

The assembly for the catalytic separation of oxygen from the gas mixture is preferably equipped with means for dosing hydrogen into the gas mixture depending on the oxygen concentration.

The catalyst is preferably selected from the group of precious metal catalysts, in particular platinum, palladium or mixtures of the same, each on a substrate material of aluminium oxide, and the adsorption agent from the group of non-precious metal catalysts, in particular copper oxide or nickel oxide, each on a substrate material of aluminium oxide or mixtures of the same.

In a further particularly preferred design variety of the device the assembly for the catalytic and/or adsorptive separation of oxygen from the gas mixture is equipped with means for introducing the gas stream depending on the oxygen content by means of the catalyst or the adsorbent. This enables a highly flexible and efficient process management.

The drying of the gas stream particularly preferably takes place using molecular sieves and/or silica gel. In this way no product to be disposed of is generated and the drying agents can be regenerated, which keeps ongoing operating costs low. It further allows an automation of the regeneration process, as no new manual loading process is necessary.

The drying step is preferably followed by a particle filter for removing catalyst and drying agent abrasion, which will prevent an ingress of dust into the cryogenic purification process.

With a particularly preferred design variety the drying step of the device works with two containers operated reciprocally, of which one container takes over the drying operation, and the other container the regeneration operation. The use of two drying containers allows a continuous operation of the plant. Whilst one container can work with fresh or regenerated drying agent in a drying operation, the second container whose drying agent is completely loaded, can be regenerated. Switching between the operating conditions can be fully automatic. The regeneration of the drying agent is preferably carried out with argon at temperatures of 150 to 250° C., particularly preferably 200° C.

According to a further design variety of the device the catalytic unit is equipped with temperature sensors at its inlet and outlet, and the oxygen content in the gas mixture is calculated from the temperature difference.

If the device is envisaged for operation with an atmospherically operated furnace for melting silicon it is preferably equipped with an extraction system for collecting the gas mixture, the same being affixed at two points below the normal furnace outlet and extracting a part stream of the shielding gas. The extraction, which could in principle also be possible at one single point, is realised in two places in order to prevent as much as possible that the flow conditions within the furnace are interrupted. The extraction system is preferably operated at a pressure of 0-200 mbar, particularly preferably at a pressure of 0-100 mbar.

If the device is operated with a furnace operating under vacuum for melting silicon the collecting container for collecting the gas mixture is particularly preferably connected with the exhaust gas lines of the vacuum pumps and one or more deoiling devices are installed between the vacuum pumps and the collecting container if the pumps are oil lubricated.

A particularly preferred embodiment of the invention will now be described in more detail with reference to the drawing of FIG. 1. The suggested plant represents only one example of applying the invention, and should not be viewed as restrictive.

The plant shown in FIG. 1 is designed for the regeneration of argon, which serves as the sole or main component of a shielding gas mixture during the production of mono- and/or polycrystalline silicon wafers for solar cells. During the preparation of the argon additional components that may be present in the shielding gas are separated during the cryogenic purification step at the latest, if they have not already been catalytically converted previously.

The crystal pulling furnaces (1) are furnaces operating vertically according to the string ribbon process and are open at the top. Apart from the silicon foil produced, the shielding gas mixture also exist there to prevent an ingress of air into the melting furnace section. Just below the shielding gas outlet to atmosphere two connections each are located, through which the shielding gas can be extracted without the same mixing with ambient air. The extraction is preferably realised via a closed circular pipeline, to which several furnaces can be connected. In this way the pressure conditions for all furnaces can be kept as constant as possible.

The gas mixture flows via the closed circular pipeline into the collecting container (2). Extraction is realised by means of the pumps (3) located behind the collecting container (2). The extraction performance of each furnace is measured with a suspended body flow meter. Each flow meter is equipped with a manual control valve (4) to be able to compensate for different pressure losses, so that the extraction power for all furnaces can be set to the same value.

The pumps (3) convey the shielding gas mixture to the catalytic cleaning step (5), which is equipped with a temperature sensor (6, 7) each at the inlet and outlet of the catalyst layer. If the pumps (3) are electrically switched off the compressor pressure on the suction side (collecting container (2)) is automatically relaxed via the magnetic valve (8).

The catalytic conversion of the oxygen present in the gas mixture with hydrogen into water takes place during the catalytic cleaning step (5) that is filled with a palladium catalyst on an aluminium oxide substrate. Depending on the oxygen content temperatures at the inlet will typically be 20-150° C., and 20-500° C. at the outlet. Not illustrated separately in the drawing is the integrated dosing device with which so much hydrogen is introduced into the gas stream that a hydrogen concentration of 0.1 vol. % above the stoichiometric quantity is achieved for water formation. The heat generated during the exothermic reaction is extracted from the gas mixture via the cooler (9) operated with coolant air switched downstream from the catalytic cleaning step (5).

The moisture created during the reaction must be removed by means of the downstream dryer (10) so that the subsequent low temperature cleaning is not interrupted by the formation of ice. The dryer (10) is equipped with a filling of a molecular sieve. When the load capacity of the drying agent has been exhausted it must be regenerated. The drying step is therefore designed with two containers, to be operated or regenerated alternately. The change of driers and the regeneration with argon heated to 150 to 250° C., preferably approx. 200° C., is carried out fully automatically. A particle filter (11) is installed after the drying step in order to retain abrasion from the adsorption agent and the catalyst.

The pumps (3) that extract the shielding gas mixture are positively controlled pumps and can be controlled only by means of gas recirculation. The extraction power is also determined by the pre-pressure before the pump. For this reason a flow meter with a control valve (12) is located behind the particle filter (11) in order to be able to set a permanent gas stream back into the collecting container (2). An overflow valve that will open and enable relaxation into the storage container (2) if the post-pressure behind the pumps (3) (no uptake by the consumer) is too great is further installed parallel to the same.

The recirculation of the part gas stream does not take place directly behind the pumps (3), but instead behind the particle filter (11), for two reasons. On the one hand the diverging of the gas stream already freed from oxygen has a diluting effect in the collecting container (2), which is of advantage especially with high oxygen concentrations in the gas mixture to be cleaned, whilst this operating method allows a more cost effective temperature management on the other hand. To prevent an excessive temperature load on the pumps (3) the gas stream to be recirculated and heated through compression must be cooled. By sizing the cooler (9) following the catalytic cleaning step (5) a little larger the installation of a second cooler in the return gas stream can be omitted and a cost reduction realised in this way.

Two further pumps (13) are located after the particle filter (11) for increasing the gas pressure to 3-10 bar, preferably approx. 8 bar. Following this the gas mixture undergoes cryogenic purification (14). During cryogenic purification one takes advantage of the various boiling points of the components contained in the exhaust gas. In principle the same consists of a rectification at low temperatures as one would also use with so-called air separators. The cleaned argon is extracted from the rectification column in liquid form and can either be stored directly in a liquids tank or—as with the example illustrated—evaporated in an evaporator (not shown in the drawing) and made available again for the crystal pulling process at a pressure of 0-approx. 20 bar. For liquid argon storage an increased cooling capacity is however required.

Liquid nitrogen is used as a coolant for the cryogenic purification process (14) in order to generate the low temperatures necessary for liquefaction. A heat exchanger integrated into the cryogenic purification (14) ensures that the gas mixture entering the plant is pre-cooled and exiting argon is warmed. In this way the consumption of liquid nitrogen is minimised.

The cleaned evaporated argon is then transferred to a buffer store (15). Prior to recirculating to the crystal pulling furnaces (1) further components of the shielding gas (additive) are dosed into the recycled argon via the pneumatic valve (16) if required to reconstitute the starting concentration. Dosing is realised via the flow meter with the aid of a control valve (17). The concentrations are monitored with suitable analysis equipment. If additive concentrations are too high the supply is automatically interrupted with the aid of the valve (16). At the same time the supply of recycled argon via the valve (18) is interrupted. Both pneumatically activated valves are jointly controlled by means of a solenoid valve.

Even when a fault occurs in the plant or when no argon can be cleaned it is ensured that the crystal pulling furnaces (1) are supplied with shielding gas at all times. A pressure regulator (19) follows the buffer store (15) and is set approx. 0.5 bar higher than the normal supply pressure of the shielding gas. If the pressure of the cleaned argon drops too far fresh gas is automatically introduced. A non-return valve (20, 21) each is installed to prevent that the recycling argon mixture mixes with fresh argon.

LIST OF REFERENCE NUMBERS

1 Crystal pulling furnace
2 Collecting container
3, 13 Pump
4 Control valve
5 Catalytic cleaning step
6, 7 Temperature sensor
8 Solenoid valve
9 Cooler
10 Dryer
11 Particle filter
12, 17 Flow meter with control valve
14 Cryogenic purification
15 Buffer container
16, 18 Valve
19 Pressure regulator
20, 21 Non-return valve

The invention claimed is:
1. A method for recycling argon by separating and cleaning the argon from a gas mixture, comprising the process steps of:
collecting of the gas mixture in a collecting container;

separating oxygen from the gas mixture depending on an oxygen content of the gas mixture;
drying the remaining gas mixture; and
cryogenically purifying the remaining gas mixture in a rectification column,
whereby cleaned argon is extracted from the rectification column in liquid form.

2. The method according to claim 1, wherein the cleaned argon is used for pre-cooling a gas stream entering cryogenic purification and is subsequently evaporated in an evaporation unit.

3. The method according to claim 1, wherein the oxygen content in the gas mixture is determined by determining the temperature difference between an inlet and outlet of a catalyst unit.

4. The method according to claim 1, wherein a collection of the gas mixture from an atmospherically operating furnace for melting silicon is realized by means of an extraction system working with underpressure, the same being located below a normal furnace outlet and extracting a part of the stream of a shielding gas.

5. The method according to claim 1, wherein a collection of the gas mixture from a furnace operating under vacuum for melting silicon is realized by means of extracting an exhaust gas stream of a plurality of vacuum pumps and that deoiling takes place prior to introducing the same into the collecting container if the vacuum pumps are oil lubricated.

6. The method according to claim 1, wherein the step of separating oxygen from the gas mixture depending on the oxygen content of the gas mixture further comprises separating the gas mixture at an oxygen content up to 0.01 volume percent in the gas mixture through adsorption.

7. The method according to claim 1, wherein the step of separating oxygen from the gas mixture depending on the oxygen content of the gas mixture further comprises separating the gas mixture at an oxygen content greater than 0.01 volume percent in the gas mixture through catalytic conversion with hydrogen into water.

* * * * *